United States Patent [19]
Park et al.

[11] Patent Number: 5,335,117
[45] Date of Patent: Aug. 2, 1994

[54] DIGITAL MAGNETIC RECORDING/REPRODUCING METHOD AND APPARATUS THEREFOR FOR RECORDING RE-ARRANGED SYNC BLOCKS

[75] Inventors: Ku-man Park, Seoul; Tae-eung Kim, Suwon, both of Rep. of Korea

[73] Assignee: Samsung Electronics Co., Ltd., Kyungki, Rep. of Korea

[21] Appl. No.: 971,062

[22] Filed: Nov. 3, 1992

[30] Foreign Application Priority Data

Mar. 14, 1992 [KR] Rep. of Korea ............... 92-4227

[51] Int. Cl.$^5$ .................... G11B 5/09; H04N 5/76
[52] U.S. Cl. .................... 360/48; 360/32; 358/335
[58] Field of Search .............. 360/8, 10.3, 29, 32, 360/48, 53; 358/133, 335

[56] References Cited

U.S. PATENT DOCUMENTS

| | | | |
|---|---|---|---|
| 4,742,519 | 5/1988 | Abe et al. ............... | 371/38 |
| 4,831,440 | 5/1989 | Borgers et al. ........... | 358/133 |
| 4,914,527 | 4/1990 | Asai et al. .............. | 360/10.3 |
| 4,939,583 | 7/1990 | Tsuboi et al. ........... | 358/261.1 |
| 5,023,710 | 6/1991 | Kondo et al. ............ | 358/133 |
| 5,146,324 | 1/1992 | Miller et al. ........... | 358/133 |

OTHER PUBLICATIONS

C. Yamamitsu, "A Study on Trick Plays for Digital VCR", *IEEE*, 1991, pp. 184–185.
C. Yamamitsu, "An Experimental Study for a Home-Use Digital VTR," *IEEE Transactions on Consumer Electronics*, vol. 35, No. 3, pp. 450–456. Aug. 1989.
Sin-Wai Wu, "Rate-Constrained Optimal Block-Adaptive Coding for Digital Tape Recording of HDTV," *IEEE Transactions on Circuits & Systems for Video Technology*, vol. 1, No. 1, Mar. 1991, pp. 100–101.
Nobukazu Doi, "Adaptive DCT Coding for Home Digital VTR," *GLOBECOM*, 1988, pp. 1073–1079.
John Watkinson, "Coding for Digital Recording," *Focal Press*, 1990, pp. 209–212.
Allen Gersho and Robert Gray, "Vector Quantization and Signal Compression," *Kluwer Academic Publishers*, 1991, pp. 451–459.

*Primary Examiner*—Donald Hajec
*Assistant Examiner*—Won Tae C. Kim
*Attorney, Agent, or Firm*—Sughrue, Mion, Zinn, Macpeak & Seas

[57] ABSTRACT

A method for digital magnetic recording and reproducing of video images while compressively encoding video image data to reduce a bit rate includes the steps of forming the compressed data into sync-block units corresponding to minimum units for error-correcting, recording the compressed data as sync block units on a plurality of tracks of a digital magnetic tape, and reproducing a recognizable image corresponding to the video image data from the recorded compressed data. According to one aspect of the method, the sync blocks are arranged so as to be recorded on the plurality of tracks using a line sequential scanning method in the track-traversing direction, and the arranged sync blocks are restored to their original locations during reproduction. A digital magnetic recording and reproducing apparatus suitable for implementing the above method is also disclosed.

9 Claims, 3 Drawing Sheets

FIG. 3

DIGITAL MAGNETIC RECORDING/REPRODUCING METHOD AND APPARATUS THEREFOR FOR RECORDING RE-ARRANGED SYNC BLOCKS

FIELD OF THE INVENTION

The present invention relates to a digital magnetic recording and reproducing method and apparatus therefor. More specifically, the present invention is related to a digital magnetic recording and reproducing method and apparatus therefor which improves the quality of a reproduced image during variable-speed playback operations.

BACKGROUND OF THE INVENTION

When recording a color video image onto a digital magnetic tape, a conventional digital video cassette recorder (VCR) uses one of several compressive encoding methods to promote and improve recording efficiency. One standard compressive method is discrete cosine transform (DCT) variable-length encoding in which the number of output bits varies according to picture complexity. U.S. Pat. Nos. 4,831,440 and 4,939,583 respectively illustrate examples of the DCT and variable-length encoding techniques. However, when recording digital data onto a digital magnetic tape, fixing the number of output bits to a predetermined number of bits is very important.

It will be appreciated that the number of bits is a critical factor during variable-speed playback operations such as a high speed search operation. Since a playback head scans a plurality of tracks by traversing them during the high speed search operation, the output gain of the playback head decreases when it passes over the area of the tape between the recorded tracks. Thus, the playback head produces a diamond-shaped waveform envelope. Therefore, in the conventional recording and reproducing method, in order to arrange the minimum required video data necessary to reproduce a recognizable video image from a region scanned by a playback head, i.e., from a reproducible region video data is mixed so that it can be rearranged in a track or data for several tracks is rearranged into different tracks during a variable-speed playback operation, e.g., during a high speed search. However, in the conventional method, since the regions of the digital magnetic tape scanned by the playback head are different for each track, the format for rearranging the video data must be different for each track. This necessitates the use of a complicated rearrangement algorithm and, consequently, complicated circuitry for implementing the rearrangement algorithm.

SUMMARY OF THE INVENTION

The principle object of the present invention to is provide a digital magnetic recording and reproducing method which is capable of improving the quality of a reproduced video image during a variable-speed playback operation such as a high speed search.

Another object of the present invention is to provide a digital magnetic recording and reproducing method which facilitates the rearrangement of video data.

Still another object of the present invention is to provide a digital magnetic recording and reproducing apparatus suitable for performing the above methods.

These and other objects, features and advantages of the present invention are provided by a digital magnetic recording and reproducing method which includes the steps of compressively encoding video image data to reduce video data bit rate, forming the compressed data into sync block units corresponding to minimum units for error-correcting, recording the sync block units on a plurality of tracks of a digital magnetic tape, and reproducing the video image from the recorded sync block units.

According to one aspect of the present invention, the sync blocks are recorded so as to be arranged alternately on the plurality of tracks using a line sequential scanning method in the track-traversing direction. According to another aspect of the present invention, the sync blocks which are arranged in a predetermined order prior to recording are restored to their original order during playback.

According to the present invention, each sync block advantageously contains a sync code, an ID code, an independently decodable first data code, a first error-correcting code for error-correcting the first data code, a second data code which is decodable dependent on said first data code, and a second error correcting code for error-correcting the second data code. During variable-speed playback, only the first data code is decoded.

These and other objects, features and advantages of the present invention are provided by a digital magnetic recording and reproducing apparatus including an encoder for encoding video image data for recording on a digital magnetic tape and a decoder for decoding data recorded on the digital magnetic tape to restore the original video image data.

According to one aspect of the present invention, the encoder includes: a data compressive encoder for compressively encoding video image data to generate compressively encoded data, an error correction coding (ECC) encoder for providing the compressively encoded data with error-correcting codes and an ID code, for forming the compressively encoded data into sync blocks corresponding to minimum units of video image data for error-correction, and for providing the sync blocks with a sync code; a rearranger circuit for rearranging the order of the sync blocks to produce rearranged data so as to permit the sync blocks to be recorded alternately onto a plurality of tracks using a line sequential scanning method which traverses the tracks and a channel coder for channel-coding the rearranged data for transmission and recording on the digital magnetic tape. According to another aspect of the present invention, the decoder includes: a channel decoder for channel-decoding rearranged data reproduced from the digital magnetic tape so as to produce channel-decoded data; an inverse rearranger circuit for restoring the arrangement of the channel-decoded data by sync blocks to an order corresponding to original video image locations; an ECC decoder for error-correcting the restored ordered sync blocks and a data decompressive decoder for decompression-decoding the error-corrected and compressively encoded data to restore the video image data.

BRIEF DESCRIPTION OF THE DRAWINGS

The above objects and other advantages of the present invention will become more apparent by describing in detail a preferred embodiment of the present invention with reference to the attached drawings in which:

FIG. 3 illustrates a rearrangement recording format of sync blocks according to the present invention;

DETAILED DESCRIPTION OF PREFERRED EMBODIMENTS

Figure 1:
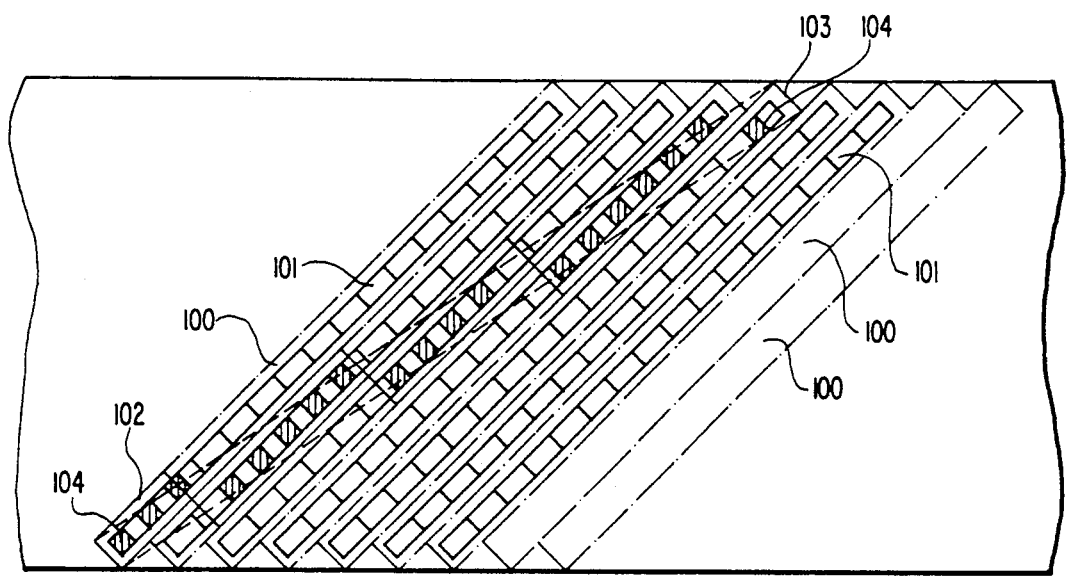
FIG. 1 is an exemplary illustration showing a recording format for recording digital video data onto a digital magnetic tape and head scanning tracks on the digital magnetic tape during a variable speed playback according to the present invention.

The present invention will now be described while referring to FIGS. 1 through 5. FIG. 1 illustrates a digital magnetic tape onto which digital data corresponding to video image data is recorded on a plurality of recording tracks, generally denoted 100. Each recording track 100 includes a plurality of sync blocks 101, which can be recorded or reproduced from each track 100 during normal speed operations.

During variable speed operations, such as high speed playback of high speed searching of the recorded digital magnetic tape, each scan head of the VCR traverses a plurality of tracks 100, as illustrated by the head scan track 103. Thus, each of the tracks traversed during variable speed operations includes a reproducible region 102, as illustrated in FIG. 1. As explained in greater detail below, each of the tracks 100 includes a plurality of regions, generally denoted 104 and shown by hatched regions on the various tracks, which advantageously can be used to produce a recognizable video image during variable speed playback operation.

Figure 2:
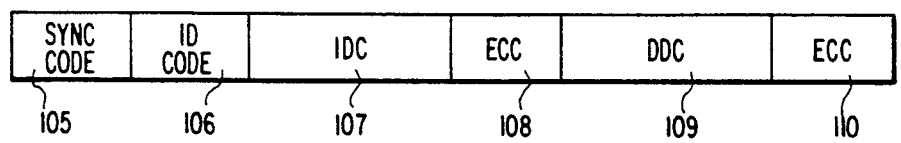
FIG. 2 illustrates the formation of sync block employed in the recording format illustrated in FIG. 1.

Referring to FIG. 2, each of the sync blocks 101 contains a sync code 105, an ID code 106, a first data code 107, a first error correcting code 108, a second data code 109, and a second error correcting code 110. Preferably, ID code 106 includes information about the field number, sector number, track number and sync number. The first data code 107, which advantageously can be independently decoded, includes the minimum video information required to produce a recognizable video image during variable-speed playback. The second data code 109, which advantageously can be decoded using the first data code 107, includes additional video image information with respect to the minimum video image information included in the first data code 107. It should be noted that the second data code 109 is employed primarily during normal playback operations. The first and second error correcting codes 108 and 110 preferably can be parity codes used to correct any errors of the corresponding first and second data codes 107 and 109, respectively, during playback.

In an exemplary case, the first data code 107 includes the DC component and lower frequency components of a DCT transfer coefficient while second data code 109 includes the higher frequency components corresponding to a portion of the video image. During a high speed search, only the DC and lower frequency components included in the first data code 107 are reproduced, thus excluding the higher frequency components included in the second data code 109. It will be appreciated that the video image produced from the first data code 107 is a recognizable video image since human vision is not greatly sensitive to the higher frequencies.

Figure 3:
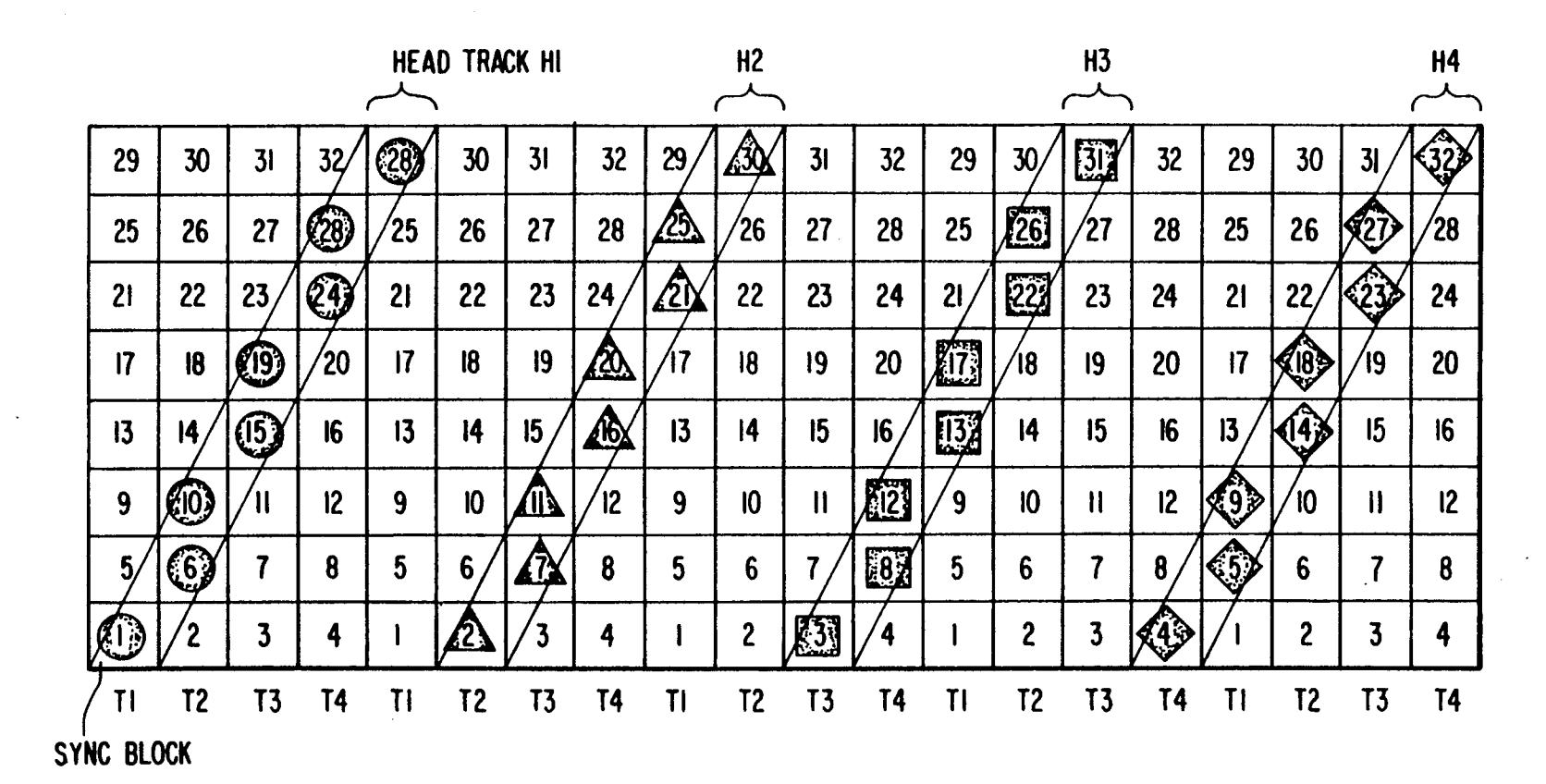

FIG. 3 illustrates the predetermined format of data corresponding to each video image recorded on a digital magnetic tape wherein one screen of video data is represented by sync blocks line-sequentially scanning four tracks $T_1$-$T_4$. A first set of sync blocks are arranged in an arithmetic progression, whose initial value is 1 and whose increment is 4, and is recorded on first track $T_1$. A second set of sync blocks are arranged in an arithmetic progression, whose initial value is 2 and whose increment is 4, and is recorded on second track $T_2$. A third set of sync blocks are arranged in an arithmetic progression, whose initial value is 3 and whose increment is 4, and is recorded on third track $T_3$. Finally, a fourth set of sync blocks are arranged in an arithmetic progression, whose initial value is 4 and whose increment is also 4, and is recorded on fourth track $T_4$.

Figure 4:
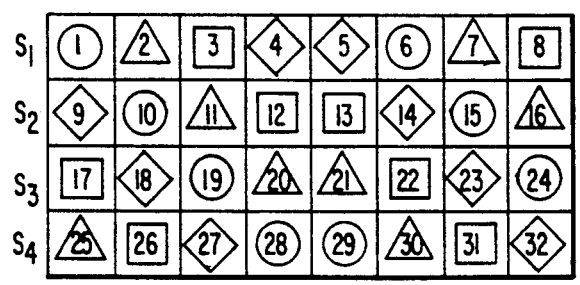
FIG. 4 illustrates reproducing regions during a five-times-normal speed playback of video data stored in the recording format of FIG. 1.

As previously discussed with respect to FIG. 1, during a variable speed playback operation, e.g., during quintuple-speed playback, data on hatched regions are picked up along the head scan tracks H1 through H4. Thus, only sync blocks from the reproducing regions of the head scan tracks H1 through H4 are reproduced during variable speed operations. However, as shown in FIG. 4, data reproduced from regions located at predetermined intervals along the digital magnetic tape can be rearranged and restored as screen segments $S_1$ to $S_4$ to reproduce a recognizable video image. Therefore, even if the sync blocks are not mixed in one or more tracks, the overall information corresponding to a recognizable video image can be reproduced during the high speed processing operations, i.e., during high speed playback.

It will be appreciated, from the description provided above, that during a high speed search operation, only the first data code 107, which is independently decodable, in a sync block is restored. Thus, the minimum size of information reproduced via each playback head is not more than half the size of a sync block. The increased amount of reproduced information advantageously improves picture quality during high speed search operations.

It should be noted that during normal speed playback, the sync blocks, which advantageously can be rearranged during recording, can be restored to an order corresponding to their original screen location. It should also be noted that the second data code 109 in each sync block can be restored along with the independently decodable first data code 107.

Figure 5:
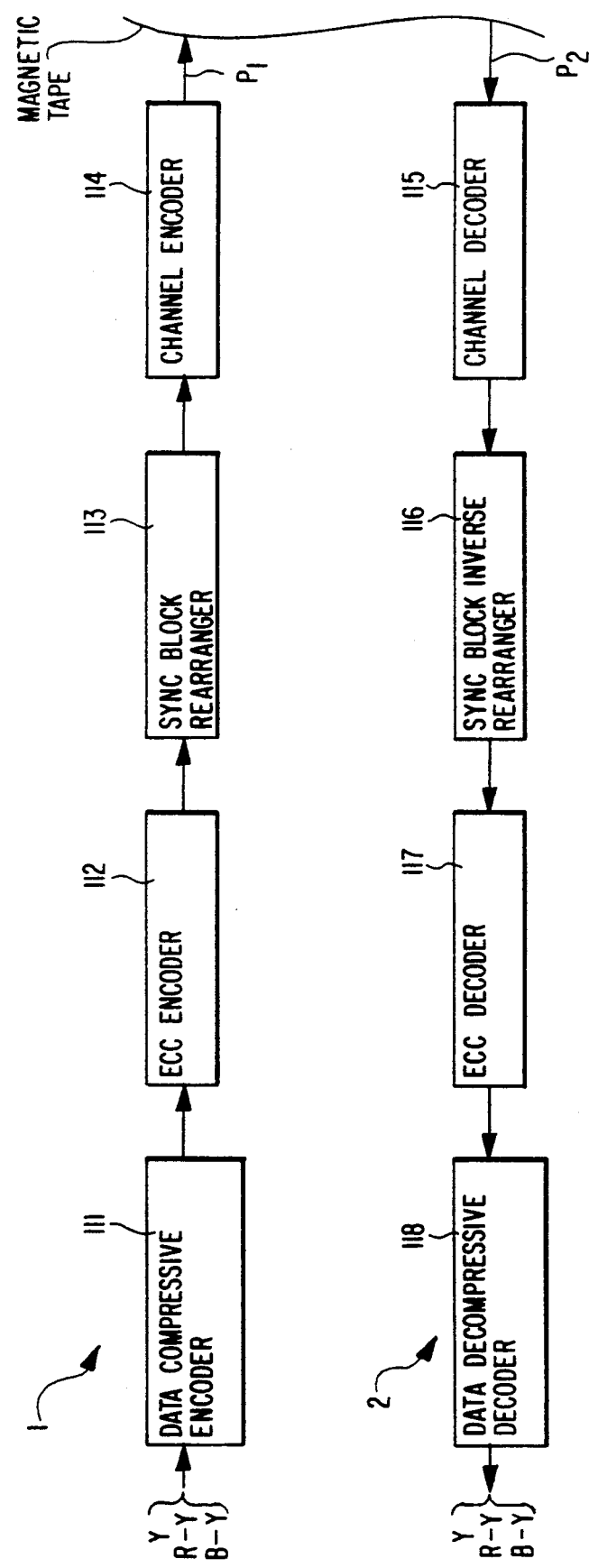
FIG. 5 is a high level block diagram of a digital magnetic recording and reproducing apparatus according to the present invention.

A digital magnetic recording and reproducing apparatus suitable for performing the method according to the present invention is illustrated in FIG. 5, wherein the apparatus includes both an encoder 1 and a decoder 2. The encoder 1 comprises a data compressive encoder 111, an ECC encoder 112, a sync block rearranger circuit 113 and a channel coder 114, which are described in greater detail below. The decoder 2 comprises a channel decoder 115, an inverse rearranger circuit 116, an ECC decoder 117 and a data decompressive decoder 118, which are also described in detail below.

The data compressive encoder 111 converts the luminance signal Y and color difference signals R-Y and B-Y into block formed data, which block-formed data is then transformed into DCT coefficients. The DCT coefficients are subsequently roughly vector-quantized to generate first vector quantization data as the independently decodable first data code 107. Quantization errors during the first vector-quantization are multi-leveldependently vector-quantized to generate second and third vector quantization data as the dependently decodable second data code 109. The techniques of vector quantization and multi-level vector quantization are described in "Vector Quantization and Signal Compression" by Allen Gersho and Robert M. Gray (Kluwer Academic Publishes, Boston, Dordrecht & London), pp. 450–453, as an example.

The ECC encoder 112 adds outer codes to code rows generated by encoder 111, provides the first data code with the first ECC code 108, provides the second data code with the second ECC code 110, and provides the data code rows with an ID code 106 and sync code 105 to form each sync block 101. It should be noted that the first and second ECC codes 108 and 110, respectively, correspond to an inner code. The outer codes, as an example, may be similar to the outer codewords described in the text entitled, "Coding for Digital Recording" by John Watkinson (Focal Press, London & Boston), pp. 209–212.

The rearranger circuit 113 writes the sync block into a memory (not shown) while incrementing the sync-block addresses, and reads out the stored sync blocks written into the memory according to a predetermined recording format, which advantageously rearranges the sync blocks 101 according to the predetermined recording format. That is, the rearranger circuit 113 rearranges the sync block data supplied in a first order from the ECC encoder 112, changes the sync block data having the first order to that of a second order corresponding to a predetermined recording format, and then writes the sync block data in the changed second order in a buffer memory (not shown). Thus, to record the sync block data stored in the buffer memory onto the tape, the stored data (i.e., stored in the second order) is read, supplied to the channel encoder 114 and then recorded on the tape in the same order.

The output of the sync blocks stored in the memory advantageously can be performed according to data corresponding to the memory addresses stored in a read only memory (ROM), which maps and records memory addresses corresponding to the predetermined recording format. In other words, rearranger circuit 113 receives sync blocks in a first order and outputs the sync blocks in a second order according to instructions corresponding to a predetermined recording format stored in ROM. The channel coder 114 then modulates the read out sync blocks from the memory to produce modulated data and transmits it to a transmitting path $P_1$. Preferably, path $P_1$ includes circuitry, well known to those of ordinary skill in the art, for recording the modulated data on the digital magnetic tape.

The channel decoder 115 demodulates a signal corresponding to the modulated data reproduced from the digital magnetic tape and transmitted over transmitting path $P_2$, which advantageously includes one or more playback heads and other circuitry well known to those of ordinary skill in the art. The inverse rearranger circuit 116 restores the order of reproduced data corresponding to sync blocks to rearrange the data into its original sync-block locations, i.e., into an order corresponding to its original order. The output of circuit 116 is then provide to the ECC decoder 117. That is, the inverse rearranger circuit 116, similar to the rearranger circuit 113, rearranges the sync block data supplied in the second order from the channel decoder 115. The inverse rearranger circuit then changes the sync block data having the second order to that of the first order corresponding to a predetermined digital signal processing format, and writes the sync block data in the changed first order into the buffer memory. Thus, to reproduce the sync block data stored in the buffer memory through a digital signal processing system (not shown), the stored data is read out in the stored first order, supplied to the ECC decoder 117, and then reproduced from the tape in the same order.

During a normal playback operation, the ECC decoder 117 error-corrects both the first and second data codes 107 and 109, respectively, by predetermined units in response to the stored inner codes, i.e., the respective first and second ECC codes 108 and 110, and outer codes. The data decompressive decoder 118 inverse-vector-quantizes and inverse-DCT-converts the error-corrected data so as to restore and output the luminance and color difference signals. As discussed above, during high speed search operations, ECC decoder 117 error-corrects only the first data codes 107 by predetermined units with the first ECC codes 108.

It will be apparent that the present invention, during recording, records one screen of video data compressed into sync blocks onto a plurality of tracks using a line-sequential scanning method, which traverses the tracks of a digital magnetic tape, and, during playback, restores the data to a location corresponding to its original location. Therefore, during a variable-speed playback operation such as a high speed search operation, a data-recording format which improves picture quality, is easily achieved. Furthermore, only the independently decodable first data code is restored, thereby reducing the minimum quantity reproduced to below the size required for each sync block so that more video data can be obtained with a better picture quality being provided during high speed search operations.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A digital magnetic recording and reproducing apparatus, comprising:
   an encoder for encoding video image data to record it on a digital magnetic tape, said encoder comprising:
   a data compressive encoder for compressively encoding the video data for producing compressively encoded data;
   an ECC encoder for providing the compressively encoded data with an error-correcting code and ID code, for forming the compressively encoded data into m sync blocks as minimum units for error-correcting, and providing said sync blocks with a sync code, where m is an integer greater than 1;
   a rearranger for rearranging said m sync blocks in a predetermined order for recording a picture unit corresponding to said video image data on k tracks, where k is an integer greater than 1, and for arranging said m sync blocks into k sync block strings, wherein a first string comprises sync blocks of 1+kn permutation, a second string comprises sync blocks of 2+kn permutuation, . . . , and a kth string comprises sync blocks of k+kn permutation, where k is an integer greater than 1 and where n is an integer from 0 to m/k, to produce rearranged data;

a channel coder for channel-coding said rearranged data to produce modulated data and for transmitting said modulated data so as to permit recording of said modulated data on the digital magnetic tape, and a decoder for decoding a signal corresponding to the modulated data recorded on the digital magnetic tape to produce a restored video image based on the original video image data and for sequentially re-arranging said sync blocks read from said magnetic tape as modulated data in an order based on said ID code in picture units irrespective of the picture to which one of said syncs blocks belongs and irrespective of playback speed during playback of said magnetic tape.

2. The digital magnetic recording and reproducing apparatus of claim 1 wherein each of said respective sync blocks further comprises an independently decodable first data code, a first err-correcting code for error-correcting said first data cord, a second data code decode-dependent on said first data code, and a second error-correcting code for error-correcting said second data code.

3. The digital magnetic recording and reproducing apparatus of claim 1, wherein each of said sync blocks comprises an independently decodable first data code, a first error-correcting code for error-correcting said first data code, a second data code decode-dependent on said first data code, and a second error-correcting code for error-correcting said second data code and wherein said decoder produces said restored video image based on said first data code in each of said sync blocks.

4. A digital recording and reproducing method in which a digital image signal is compressively coded to record data for one picture in units of k tracks on a magnetic tape and recorded compressively coded data is read out and expansively decoded to recover data in units of pictures, said method comprising the steps of:

(a) forming the compressively coded data into m sequential sync block units for every picture, where m is an integer greater than 1, said respective sync block units having an ID code;

(b) arranging said m sync block units in sync block unit strings corresponding to said k tracks to produce k sync block unit strings, wherein a first string comprises sync block units of 1+kn permutation, a second string comprises sync block units of 2+kn permutation, ..., and a kth string comprises sync block units of k+kn permutation, where k is an integer greater than 1 and where n is an integer from 0 to m/k;

(c) recording said k sync block unit strings on said corresponding k tracks of said magnetic tape;

(d) sequentially re-arranging said sync block units read from said magnetic tape in an order based on said ID code in picture units irrespective of the picture to which one of said sync block units belongs and irrespective of playback speed during playback of said magnetic tape; and (e) expansively decoding the re-arranged sync block unit data in units of pictures.

5. The digital magnetic recording and reproducing method of claim 4 wherein said respective sync block units further comprise a sync code, an independently decodable first data code, a first error-correcting code for error-correcting said first data code, a second data code decode-dependent on said first data code, and a second error-corroding code for error-correcting said second data code.

6. The digital magnetic recording and reproducing method of claim 5, wherein, during a variable-speed playback mode of operation, said step (e) comprises expansively decoding the re-arranged sync block unit data in units of pictures based on said first data code in each of said respective sync block units.

7. In a digital magnetic recording and reproducing method which compressively encodes video image data for recording on k tracks per picture unit, where k is an integer greater than 1, to reduce bit rate, the method comprising the steps of:

(a) forming compressed data into m sync block units, each including an ID code, and each corresponding to minimum units for error-correction;

(b) arranging said m sync block units in sync block unit strings corresponding to said k tracks to produced k sync block unit strings, wherein a first string comprises sync block units of 1+kn permutation, a second string compresses sync block units of 2+kn permutation, ..., and a kth string comprises sync block units of k+kn permutation, where k is an integer greater than 1and where n is an integer from 0 to m/k;

(c) recording said k sync block strings on a digital magnetic tape in corresponding said k tracks;

(d) reacting and sequentially re-arranging said sync block units from said magnetic tape in an order based on said ID code in picture units independent of the picture to which one of said sync block units belongs and independent of playback speed of said magnetic tape; and (e) generating a reproduced video image from re-arranged ones of said sync block units.

8. The digital magnetic recording and reproducing method of claim 7, wherein each of said sync block units further comprises a sync code, an independently decodable first data code, a first error-correcting code for error-correcting said first data code, a second data code decode-dependent on said first data code, and a second error-correcting code for error-correcting said second data code.

9. The digital magnetic recording and reproducing method of claim 8, wherein, during a variable-speed playback mode of operation, said step (e) comprises generating said reproduced video image based on said first data code in each of said re-arranged ones of said sync block units.

* * * * *